Patented Aug. 30, 1949

2,480,332

UNITED STATES PATENT OFFICE 2,480,332

METHOD OF MAKING MIXED GLYCEROL ESTERS OF FATTY AND HYDROXY ACIDS

Lawrence L. Little, Morris Plains, N. J., assignor to E. F. Drew & Co., Inc., New York, N. Y., a corporation of Delaware No Drawing  Application December 27, 1946, Serial No. 718,883

16 Claims. (Cl. 260—410.8)

1

The present invention is directed to mixed glyceride esters of a plurality of fatty acids and more particularly to a method of manufacture thereof to produce compounds having emulsifying properties.

It has been proposed to utilize mono- and diglycerides of higher fatty acids as addition agents to fatty compositions or the like such as ice cream mixes, shortening, etc. However, such compositions have had disadvantages in that although the addition of mono- and di-glycerides to the composition resulted in improved properties, such improvement was not sufficient in that these compounds were not readily dispersible in such compositions as ice cream. It was proposed to add soaps to such compositions in order to improve the dispersibility. This was accomplished only in part but the addition of soap is objectionable and in many cases is prohibited by statute.

In the co-pending application of George Barsky, entitled Shortening agent, Serial No. 712,243, filed November 26, 1946, and assigned to the same assignee as the present application, there is described a modification of such mono- and di-glycerides wherein the free OH group or groups of the glycerine molecule is neutralized by a lower hydroxy carboxy acid. This modification overcame the difficulties inherent in the prior materials for the stated uses but had the objection that in the process there was apparently formed a compound which imparted a bitter taste to the compositions even though used in small amounts so that it was unsuitable for edible purposes.

It is among the objects of the present invention to overcome the difficulties and disadvantages inherent in the prior art and to provide a composition which has a high degree of emulsifying action when added to fatty compositions and which will improve the qualities of the finished products.

It is also among the objects of the present invention to provide a method of treating mixed acids of the type described by a simple and inexpensive operation, whereby such composition is made more palatable even though the same is used in minor amounts in foodstuffs.

In practicing the present invention there is provided a mono- or di-glyceride of higher saturated fatty acid. The fatty acids suitable for the purpose usually contain from 12 to 22 carbon atoms and are preferably straight chain compounds. As examples, one may mention stearic, myristic and palmitic acids. The mono- and di-glycerides may be made with mixtures of

2 higher fatty acids. There is reacted with the mono- and di-glycerides a lower acid having the following structural formula: $R(OH)_nCOOH$, wherein $n$ is a small whole number from 1 to 5 and R is a hydrocarbon radical having from 1 to 5 carbon atoms. The hydroxy acid used must be water soluble. A reaction is caused to take place whereby the hydroxy acid neutralizes the OH group of the glycerine molecule forming a triglyceride.

It has been found that compositions of this kind have a bitter taste and it has been discovered that said bitterness emanates from the presence of extremely small amounts of a tri-glyceride having as the acid constituent the hydroxy acid used in the process. It has also been found that said tri-glyceride is water soluble, whereas the mixed glyceride is not soluble in water. Therefore, according to the present invention the synthetic fatty material is heated to a sufficient temperature to soften or melt the same and water is added thereto at a temperature above said melting point and the two constituents are mixed gently, the degree of mixing being sufficient to cause the solution of the tri-glyceride in the water but being insufficient to cause any substantial amount of emulsification of the synthetic fatty product. It is essential in the present invention that no emulsion be formed during this procedure as otherwise the recovery of the fatty material becomes difficult and burdensome.

The mixture is allowed to settle, forming a lower water layer and the upper fatty layer. The upper layer may be removed in any suitable manner and if desired may be treated, as for example, by steam and a vacuum to deodorize the same. The product may then be cooled on a flaking drum, forming a hard and brittle material.

A product made in accordance with the present invention may be added to an ice cream mix in a small amount, say from .1 to 2.0%. In such proportions it acts as an effective emulsifier and gives a smoother ice cream and allows more air and water to be beaten into the same whereby a considerably more palatable ice cream is obtained. It may be added to a shortening in relatively larger amounts, say from 2% to 8% of the shortening composition. Such an addition gives a higher ratio in the baked products, that is, it improves the texture and quality of the baked product so as to produce a fluffier and spongier mass.

The invention is more fully illustrated by the following specific examples.

Example 1

A mixture is made of the following constituents in the given proportions.

| | Grams |
|---|---|
| Stearic acid | 285 |
| Glycerine | 60 |
| Lactic acid | 90 |

The mixture is heated gradually to a temperature of about 150° C., the temperature being maintained for a sufficient length of time to cause a substantially complete reaction to take place. The time of reaction is from 6 to 12 hours. Water is formed during the reaction and evaporates. To facilitate the same, the operation may be conducted in a partial or substantially complete vacuum with or without the use of a reflux condenser to return to the reaction mixture condensed materials having a higher boiling point than water.

The product has a melting point of about 57° to 60° C. The reaction mixture is cooled to a temperature of about 65° C. and 600 grams of water at 65° C. is added thereto. The mixture is agitated gently for a few minutes and then allowed to settle. The upper layer containing the reaction product is removed and steamed in a vacuum and cooled to form the final product.

By this operation the glycerine tri-lacate was formed in extremely small amounts during the operation, is transferred from the fatty product to the water because of its greater solubility in the water, and the extraction is substantially complete. The resulting product is free from a bitter taste.

Example 2

The following constituents are used in the stated proportions.

| | Grams |
|---|---|
| Palmitic acid | 255 |
| Glycerine | 45 |
| Hydroxyacetic acid | 115 |

A mixture is made of the palmitic acid and glycerol and heated under such conditions as to cause esterification to take place. The time and temperature and other conditions are well-known in the art. The esterification may take place with or without the presence of an esterification catalyst in this and other procedures within the scope of the present invention. The reaction forms a mixture of the mono- and di-palmitates of glycerine. To the initial reaction product is added the hydroxy acetic acid and the temperature maintained sufficiently high to cause a further esterification reaction whereby the free OH groups of the glycerine are neutralized.

The final reaction product is cooled to a temperature above the melting point, 400 grams of hot water are added, the mixture stirred gently to remove the tri-glyceride of the hydroxy acetic acid, and the reaction product is separated from the water. The product may then be deodorized and flaked.

Example 3

The following constituents are used.

| | Grams |
|---|---|
| Myristic acid | 230 |
| Glycerine | 60 |
| Gluconic acid | 195 |

The reaction is caused to take place in two stages, in the first of which the myristic acid is reacted with the glycerine until the acid number is practically zero. This provides the di-myristic ester of glycerine. Then the gluconic acid is added thereto and the reaction conducted further at a sufficiently high temperature for a proper length of time to complete the esterification.

The product is then purified to remove water-soluble glycerine tri-gluconate, as set forth above. The product may also be subjected to further purification.

Example 4

A mixture is made of the following constituents in the stated proportions.

| | Grams |
|---|---|
| Lauric acid | 200 |
| Diglycerol | 55 |
| Hydroxy butyric acid | 90 |

The esterification is conducted as a single step by heating the mixture to a temperature of 165° C. and maintaining said temperature for eight hours. A high vacuum is provided to dry off water as it is formed and promote the reaction. Vaporized reactants are continuously returned to the reaction vessel.

The reaction product is cooled to 80° C. and water at the same temperature is added thereto. The mixture is agitated gently for about ten minutes and then allowed to settle into layers. The upper fatty layer is removed and may be further treated to purify the same or may be packaged directly for sale.

The above examples typify the character of the present invention. There is a very important advantage in the present process in that all of the tri-glyceride of the hydroxy acid may be removed from the fatty composition, which had been impossible heretofore. Also, the treatment with hot water results in deodorization of the reaction product so that further deodorization may be eliminated entirely, or in any case is considerably shortened.

Many variations in the details of the invention may be made within the spirit thereof. For instance, other hydroxy acids than those specifically set forth in the above examples may be used, it being essential that they be water soluble, monobasic carboxylic, and have not over 6 carbon atoms. The number of hydroxy groups in the water-soluble acids may vary and generally the higher the number of OH groups therein, the more effective is the emulsifying agent whereby the amount used in practice may be considerably reduced. Instead of glycerine polymerized glycerines or polyglycerols may be used. Various degrees of polymerization of the glycerine provide the alcoholic constituent which will be operative in the present invention and the amount of polymerization is limited only by the physical characteristics desired in the reaction product. Polymerization up to the penta or hexa glycerols are suitable for reaction to form the desired products.

The higher fatty acids may be derived from any suitable source and need not necessarily be of animal or vegetable origin. Also saturated fatty acids of synthetic nature may be used and the invention includes such acids having branch chains. The higher fatty acids having odd number of carbon atoms are also suitable for the purpose. In the specific examples, single acids were set forth but the products of the present invention may be made with the utilization of mixtures of higher saturated fatty acids or mixtures of the hydroxy acids, or both. Similarly, when polyglycerols are used, there may be mixtures thereof or mixtures of one or more polyglycerols with glycerine itself. In place of the water for separating the tri-glyceride of the hydroxy acid from the reaction product, other aqueous liquids may be used and any solvent for said tri-glyceride which is not a solvent for the fatty material is equally suitable for the purpose.

These and other changes in the details of the operation of the present invention may be made within the spirit thereof and the invention is therefore to be broadly construed and not to be limited except by the character of the claims appended hereto.

I claim:

1. A method which comprises providing the glycerol ester of a saturated fatty acid having from 12 to 22 carbon atoms, said ester having at least one free OH radical on the glyceryl group, mixing the same with an acid having the following general formula: $R(OH)_nCOOH$, wherein R is a hydrocarbon radical having from 1 to 5 carbon atoms and $n$ is a whole number from 1 to 5, heating said mixture to cause said hydroxy acid to combine with the free OH radical of said ester, the reaction product containing a small amount of tri-hydroxyacid glyceride, and dissolving said glyceride from said reaction product.

2. A method which comprises providing the glycerol ester of a saturated fatty acid having from 12 to 22 carbon atoms, said ester having at least one free OH radical on the glyceryl group, mixing the same with an acid having the following general formula: $R(OH)_nCOOH$, wherein R is a hydrocarbon radical having from 1 to 5 carbon atoms and $n$ is a whole number from 1 to 5, heating said mixture to cause said hydroxy acid to combine with the free OH radical of said ester, the reaction product containing a small amount of tri-hydroxyacid glyceride, and dissolving said glyceride from said reaction product by adding thereto a substantial amount of aqueous liquid, agitating sufficiently to cause said tri-glyceride to dissolve in said liquid.

3. A method which comprises providing the glycerol ester of a saturated fatty acid having from 12 to 22 carbon atoms, said ester having at least one free OH radical on the glyceryl group, mixing the same with an acid having the following general formula: $R(OH)_nCOOH$, wherein R is a hydrocarbon radical having from 1 to 5 carbon atoms and $n$ is a whole number from 1 to 5, heating said mixture to cause said hydroxy acid to combine with the free OH radical of said ester, the reaction product containing a small amount of tri-hydroxyacid glyceride, and dissolving said glyceride from said reaction product by adding thereto a substantial amount of aqueous liquid, agitating sufficiently to cause said tri-glyceride to dissolve in said liquid, allowing the mixture to settle into two layers, and removing the bottom aqueous layer from the reaction product.

4. A method which comprises providing the glycerol ester of a saturated fatty acid having from 12 to 22 carbon atoms, said ester having at least one free OH radical on the glyceryl group, mixing the same with an acid having the following general formula: $R(OH)_nCOOH$, wherein R is a hydrocarbon radical having from 1 to 5 carbon atoms and $n$ is a whole number from 1 to 5, heating said mixture to cause said hydroxy acid to combine with the free OH radical of said ester, the reaction product containing a small amount of tri-hydroxyacid glyceride, and dissolving said glyceride from said reaction product by adding thereto a substantial amount of aqueous liquid, agitating sufficiently to cause said tri-glyceride to dissolve in said liquid, the agitation being so gentle as to avoid any substantial amount of emulsification.

5. A method which comprises providing the glycerol ester of a saturated fatty acid having from 12 to 22 carbon atoms, said ester having at least one free OH radical on the glyceryl group, mixing the same with an acid having the following general formula: $R(OH)_nCOOH$, wherein R is a hydrocarbon radical having from 1 to 5 carbon atoms and $n$ is a whole number from 1 to 5, heating said mixture to cause said hydroxy acid to combine with the free OH radical of said ester, the reaction product containing a small amount of tri-hydroxyacid glyceride, and dissolving said glyceride from said reaction product by adding thereto a substantial amount of aqueous liquid, agitating sufficiently to cause said tri-glyceride to dissolve in said liquid, allowing the mixture to settle into two layers, and removing the bottom aqueous layer from the reaction product, and thereafter subjecting said product to steam in a vacuum to deodorize the same.

6. A method which comprises providing the glycerol ester of a saturated fatty acid having from 12 to 22 carbon atoms, said ester having at least one free OH radical on the glyceryl group, mixing the same with lactic acid, heating said mixture to cause said hydroxy acid to combine with the free OH radical of said ester, the reaction product containing a small amount of glycerine tri-lactate, and dissolving said glyceride from said reaction product.

7. A method which comprises providing the glycerol ester of a saturated fatty acid having from 12 to 22 carbons atoms, said ester having at least one free OH radical on the glyceryl group, mixing the same with lactic acid, heating said mixture to cause said hydroxy acid to combine with the free OH radical of said ester, the reaction product containing a small amount of glycerine tri-lactate, and dissolving said glyceride from said reaction product by adding thereto a substantial amount of aqueous liquid, agitating sufficiently to cause said tri-glyceride to dissolve in said liquid.

8. A method which comprises providing the glycerol ester of a saturated fatty acid having from 12 to 22 carbon atoms, said ester having at least one free OH radical on the glycerol group, mixing the same with lactic acid, heating said mixture to cause said hydroxy acid to combine with the free OH radical of said ester, the reaction product containing a small amount of glycerine tri-lactate, and dissolving said glyceride from said reaction product by adding thereto a substantial amount of aqueous liquid, agitating sufficiently to cause said tri-glyceride to dissolve in said liquid, allowing the mixture to settle into two layers, and removing the bottom aqueous layer from the reaction product.

9. A method which comprises providing the glycerol ester of a saturated fatty acid having from 12 to 22 carbon atoms, said ester having at least one free OH radical on the glycerol group, mixing the same with lactic acid, heating said mixture to cause said hydroxy acid to combine with the free OH radical of said ester, the reaction product containing a small amount of glycerine tri-lactate, and dissolving said glycerine from said reaction product by adding thereto a substantial amount of aqueous liquid, agitating sufficiently to cause said tri-glyceride to dissolve in said liquid, the agitation being so gentle as to avoid any substantial amount of emulsification.

10. In a method of making mixed esters of mono- and di-glyceride esters of a saturated fatty acid having from 12–22 carbon atoms with a hydroxy monocarboxy acid having from 2 to 6 carbon atoms and 1–5 OH radicals, the step of treating said ester with aqueous liquid to dissolve tri-hydroxyacid glyceride, and removing said solution from said reaction product.

11. In a method of making mixed esters of mono- and di-glyceride esters of a saturated fatty acid having from 12–22 carbon atoms with a hydroxy monocarboxy acid having from 2 to 6 carbon atoms and 1–5 OH radicals, the step of treating said ester with aqueous liquid to dissolve tri-hydroxyacid glyceride, and removing said solution from said reaction product, said treatment being by sufficiently gentle agitation to avoid any substantial amount of emulsification.

12. In a method of making mixed esters of mono- and di-glyceride esters of a saturated fatty acid having from 12-22 carbon atoms with a hydroxy monocarboxy acid having from 2 to 6 carbon atoms and 1–5 OH radicals, the step of treating said ester with aqueous liquid to dissolve tri-hydroxyacid glyceride, maintaining said liquid at a temperature above the melting point of said mixed ester, and removing said solution from said reaction product.

13. A method which comprises providing the glycerol ester of a saturated fatty acid having from 12 to 22 carbon atoms, said ester having at least one free OH radical on the glyceryl group, mixing the same with an acid having the following general formula: $R(OH)_nCOOH$, wherein R is a hydrocarbon radical having from 1 to 5 carbon atoms and $n$ is a whole number from 1 to 5, heating said mixture to cause said hydroxy acid to combine with the free OH radical of said ester, the reaction product containing a small amount of tri-hydroxyacid glyceride, and dissolving said glyceride from said reaction product by adding thereto a substantial amount of aqueous liquid, maintaining said liquid at a temperature above the melting point of said mixed ester, agitating sufficiently to cause said tri-glyceride to dissolve in said liquid.

14. A method which comprises providing the glycerol ester of a saturated fatty acid having from 12 to 22 carbon atoms, said ester having at least one free OH radical on the glyceryl group, mixing the same with lactic acid, heating said mixture to cause said hydroxy acid to combine with the free OH radical of said ester, the reaction product containing a small amount of glycerine tri-lactate, and dissolving said glyceride from said reaction product by an aqueous liquid at a temperature above about 60° C.

15. A composition of matter comprising the glycerol ester of a saturated fatty acid having from 12 to 22 carbon atoms having at least one free OH radical on the glycerol group, the latter being esterified with an acid having the following general formula: $R(OH)_nCOOH$, wherein R is a hydrocarbon radical having from 1 to 5 carbon atoms and $n$ is a whole number from 1 to 5, said mixed ester being free from tri-hydroxy acid glyceride.

16. A composition of matter comprising the glycerol ester of a saturated fatty acid having from 12 to 22 carbon atoms having at least one free OH radical on the glyceryl group, the latter being esterified with lactic acid, said mixed ester being free from glycerine tri-lactate.

LAWRENCE L. LITTLE.

REFERENCES CITED

The following references are of record in the file of this patent:

UNITED STATES PATENTS

| Number | Name | Date |
|---|---|---|
| 470,714 | Sommer | Mar. 15, 1892 |
| 1,505,560 | Grun | Aug. 19, 1924 |
| 1,547,571 | Ellis | July 28, 1925 |
| 2,236,569 | Grettie | Apr. 1, 1941 |
| 2,266,591 | Eckey | Dec. 16, 1941 |
| 2,322,494 | Wirtel | June 22, 1943 |
| 2,329,166 | Tucker | Sept. 7, 1943 |